April 29, 1947. J. B. COOPER ET AL 2,419,707
RATIO ATTACHMENT FOR PRESSURE CABIN CONTROLS
Filed May 16, 1942 5 Sheets-Sheet 1

Fig. 1.

Inventors
James B. Cooper
Alfred B. Jepson
By Reynolds Beach
Attorneys

April 29, 1947.  J. B. COOPER ET AL  2,419,707
RATIO ATTACHMENT FOR PRESSURE CABIN CONTROLS
Filed May 16, 1942  5 Sheets-Sheet 2

Fig. 2.

Inventors
James B. Cooper
Alfred B. Jepson
Reynolds & Beach
Attorneys

Inventors
James B. Cooper
Alfred B. Jepson
Reynolds & Beach
Attorneys

Fig. 5.

Inventors
James B. Cooper
Alfred B. Jepson

Patented Apr. 29, 1947

2,419,707

UNITED STATES PATENT OFFICE

2,419,707

RATIO ATTACHMENT FOR PRESSURE CABIN CONTROLS

James B. Cooper and Alfred B. Jepson, Seattle, Wash., assignors to Boeing Aircraft Company, Seattle, Wash., a corporation of Washington Application May 16, 1942, Serial No. 443,180

11 Claims. (Cl. 98—1.5)

There are now available and in production systems for supercharging aircraft cabins, meaning by the term "cabin" any habitable space within an aircraft. For instance, such systems are disclosed in the copending application of the present applicants Serial No. 415,603, filed October 18, 1941. Such systems incorporate a control unit which is itself the subject of an application for patent by the present applicants, Serial No. 415,602, filed October 18, 1941, and which also is in production.

The characteristics of such systems from the physiological point of view are, (1) that they maintain adequate ventilation at all times and at all altitudes to insure a sufficient supply of fresh air and oxygen, and to remove the vitiated air, and (2) that they supply the air under sufficient absolute pressure, even at the uppermost altitudes, that human life is supportable. From the structural standpoint the common characteristic of all such practical pressure cabin systems is that there is a means to elevate the pressure within the cabin above exterior pressure, which begins to operate at some selected altitude, and a further means which prevents cabin pressure reaching any value which, relative to exterior pressure, will exceed the structural limits. For instance, in the particular system referred to, cabin pressure is maintained substantially constant throughout a low or medium altitude range, and there is a means for overriding any such control and of imposing a differential pressure control upon the control unit at higher altitudes, to the end that the bursting stress for which the structure is designed will never be exceeded.

The physiological characteristics referred to must always be preserved, and the structural characteristics mentioned are also desirable, and should be maintained, but there is a further characteristic, structural or design in nature, which is also desirable to observe in the operation of the system. The centrifugal blowers employed as superchargers have each a characteristic maximum compression ratio, which can not be exceeded. This sets a definite limit upon the capacity of the system, and upon the differential pressure attainable at the highest altitudes, unless the blower is made of such excess capacity as will, at the highest altitudes, maintain the required differential pressure within the blower's compression ratio. But this in turn is undesirable, for it means excess weight and excess power throughout all except the maximum delivery range of the blower. It is therefore desirable to provide means whereby the supercharged pressure demand will never exceed the maximum blower compression ratio and which exercises an overriding control on the system as a whole, even though this may, at the highest altitudes require some reduction in the cabin differential pressure. Thus an adequate continuous flow of air through the cabin for replacement purposes can be maintained since delivery of air will not be prevented by a demand for too high a pressure by mechanism tending to maintain a relatively high constant differential pressure between the cabin and the atmosphere. Moreover regulation of the pressure in accordance with the blower output pressure will enable the blower to deliver sufficient air at high altitudes to prevent surging conditions in the blower outlet without incorporation of a surge relief device in the air supply mechanism, or a blower speed control operable at such high altitudes. This, indeed, is the subject-matter of our copending application Serial No. 443,181, filed May 16, 1942, intended as a generic application, and of which this application is in effect a division.

These characteristics and improvements are also the primary aim of the present application, but it is further desired to provide mechanism to this end which is particularly designed for operation with and connection to a system and a control unit of the type already in production and available so that the advantages of the improved system may be achieved in the systems and by the use of the control units already available, and so that it is not necessary to redesign the unit or the system, to make new dies or tools, or to make material changes in either the unit or the system. The present invention, therefore, merely adds a supplemental control to the unit now available, with no change in the latter, other than a substitution of one part for another, in some instances.

The provision of a control unit and a system of the above nature, capable of ready connection to the system and control unit now available, is the major aim of the present invention.

In the accompanying drawings the invention is shown in somewhat diagrammatic fashion, and it will be understood that the form and arrangement of the added control particularly, and its mode of connection with the operative control unit may be varied without departure from this invention.

Figure 5:
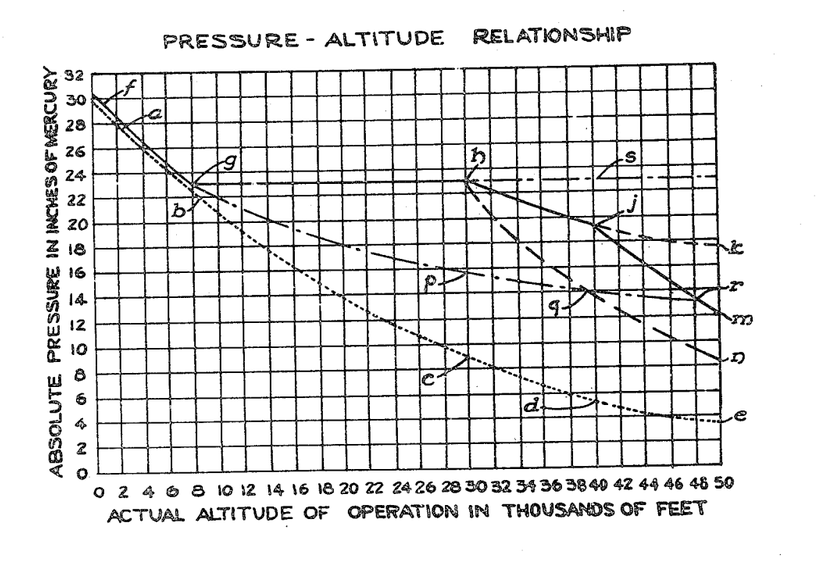
Figure 5 is a graph illustrating typical pressure-altitude relationships which can be obtained by the use of the device of the present invention.

By reference to Figure 5 the purposes of the present invention and the manner in which it attains its ends will be seen at a glance. The barometric curve is shown at $a$—$b$—$c$—$d$—$e$, the absolute values varying from approximately 30 inches of mercury at zero altitude to something less than 4 inches of mercury at 50,000 feet. The latter pressure is far too low to support human life, consciousness and activity. Average humans are unable to act efficiently when subjected to atmospheric conditions above 12,000 feet for extended periods, because of the lack of oxygen, and can not remain conscious for any appreciable length of time at altitudes above 20,000 feet. It would be preferable instead that the cabin pressure at 50,000 feet be the equivalent of cabin pressure at not over 16,000 feet, at which the pressure is slightly more than 16 inches of mercury, but even this involves a pressure difference of about 12½ inches of mercury, above the ambient pressure at 50,000 feet. The aircraft structure can be made sufficiently strong to withstand this pressure difference, but in order to maintain this pressure difference at 50,000 feet, where the absolute pressure of the atmosphere only slightly exceeds 3 inches of mercury, would require a blower having a compression ratio of approximately 5 to 1, whereas at 40,000 feet, at which the ambient pressure is about 5⅓ inches of mercury, an absolute cabin pressure of 16 inches of mercury, equal to ambient pressure at 16,000 feet, could be maintained with a blower having a ratio of only 3 to 1. Particularly is a blower ratio of 5 to 1 excessive when a blower of this compression ratio at sea level would be capable of delivering air under pressure in the neighborhood of 150 inches of mercury. It is preferable to provide a blower with fewer stages and consequent lower weight having a compression ratio not higher than about 3.5 to 1, which, as shown by curve $j$—$m$ in Fig. 5, at 43,000 feet would maintain a cabin absolute pressure of 16 inches of mercury, equal to the ambient pressure at 16,000 feet, or perhaps to employ a blower with a still lower compression ratio of about 2.5 to 1 which would maintain such an absolute cabin pressure at almost 37,000 feet, as shown by curve $h$—$n$. Trained and especially conditioned personnel can, with the use of oxygen, endure for limited periods atmospheric pressures equivalent to 35,000 or a maximum of 40,000 feet, though higher pressures are desirable. At 50,000 feet a blower ratio as low as 2.5 to 1 will produce an absolute cabin pressure of about 4 pounds per square inch, or 8 inches of mercury, the equivalent of 32,000 feet.

Assuming the blower with the larger compression ratio, 3.5 to 1, is employed, that compression ratio carried down to lower altitudes will cross the differential pressure line $h$—$k$, representing a differential pressure of 14 inches of mercury, at the point $j$, corresponding to 40,000 feet altitude. Even though the cabin structure, then, might support pressure along the line $h$—$k$ to $k$, the blower's compression ratio places a limit upon the differential that can be maintained, and will produce this differential only to $j$, that is, from 30,000 to 40,000 feet, and then from 40,000 to 50,000 feet the cabin pressure follows the blower compression ratio line $j$—$m$.

If the blower of lower compression ratio, 2½ to 1, is used, developing the cabin pressure represented at $n$ at 50,000 feet, its compression, represented by curve $n$—$h$, at altitudes above 30,000 feet may never be able to exceed the cabin pressure differential of 14 inches of mercury which is permissible, and be able to attain that differential only at or below 30,000 feet. Accordingly, while the cabin structure may be designed to hold the difference attained at that altitude, no differential pressure limit control may be needed, since at that point the blower compression ratio control takes over, and prevents the cabin differential from increasing, causing it rather to decrease.

As in prior applications, and particularly as disclosed in the Price Patents Nos. 2,208,554 and Re. 22,272, the control may be such that at the lowest altitude range, from sea level to 8,000 feet, for example, the cabin pressure has only a slight differential above barometric pressure, due to restriction of the outflow, which is represented at $a$—$f$ or $b$—$g$. At some selected point, 8,000 feet as shown, represented at the point $g$, an absolute pressure control may automatically take over, as in the Price patents, and the cabin pressure may be maintained constant as represented by the isobaric graph $g$—$h$. At the point $h$ the absolute pressure control is automatically overridden, either by the differential pressure control to maintain the differential along the curve $h$—$j$, or by the blower pressure ratio control to maintain the blower compression ratio $h$—$n$. If the higher blower compression ratio is employed, the differential pressure control may take over from $h$ to $j$, and at $j$ the blower pressure ratio control automatically overrides the differential pressure control and maintains a decreasing cabin absolute pressure, never in excess of the blower compression ratio, as represented at $j$—$m$.

It will be quite understandable from our prior applications referred to above that between an upper limit such, for instance, as the line $k$—$j$—$h$ extended, and the barometric line $a$—$b$—$c$—$d$—$e$, the cabin pressure may be manipulated and controlled in any manner desired, but since the means for so doing have already been disclosed in these prior applications, it is not deemed necessary to set forth the manner of so doing in great detail in this application, since this application is concerned primarily with a system wherein there is an overriding blower compression ratio control, regardless of what prior controls were provided. It will be observed, however, that the ratio control can be arranged to override a proportional control, such as $g$—$p$—$q$—$r$, wherein, as explained in our application Serial No. 415,602, the relation $$\frac{hp}{pc} = \frac{sq}{qd}$$

is always maintained.

It is believed it will be unnecessary to illustrate in this application the complete system for the control of pressure in such an aircraft cabin. Such a system is shown in our copending application filed conjointly herewith, and in certain prior applications. It comprises in its preferred form a centrifugal blower variably driven as to speed by and from a propelling engine, an auxiliary engine, or like power source. This blower delivers within the cabin atmospheric air at a pressure which is not in excess of the blower's compression ratio, but which may be materially less, within the cabin. In a preferred system regulation of the blower speed is under flow control. The pressure thus supplied within the cabin is regulated by an outflow control valve under control of certain pressure factors, and that outflow valve is illustrated herein in Figures 1, 2, 3, and 4. The same control is also disclosed in our application Serial No. 415,602, and as has been indicated, it is one of the principal objects of this invention to provide a ratio control which can be associated with the existing control unit in such manner that the structure and parts of the latter need not be changed in any material respect, if at all, and therefore immediate production can be obtained on the control unit with the added ratio control.

Figure 4:
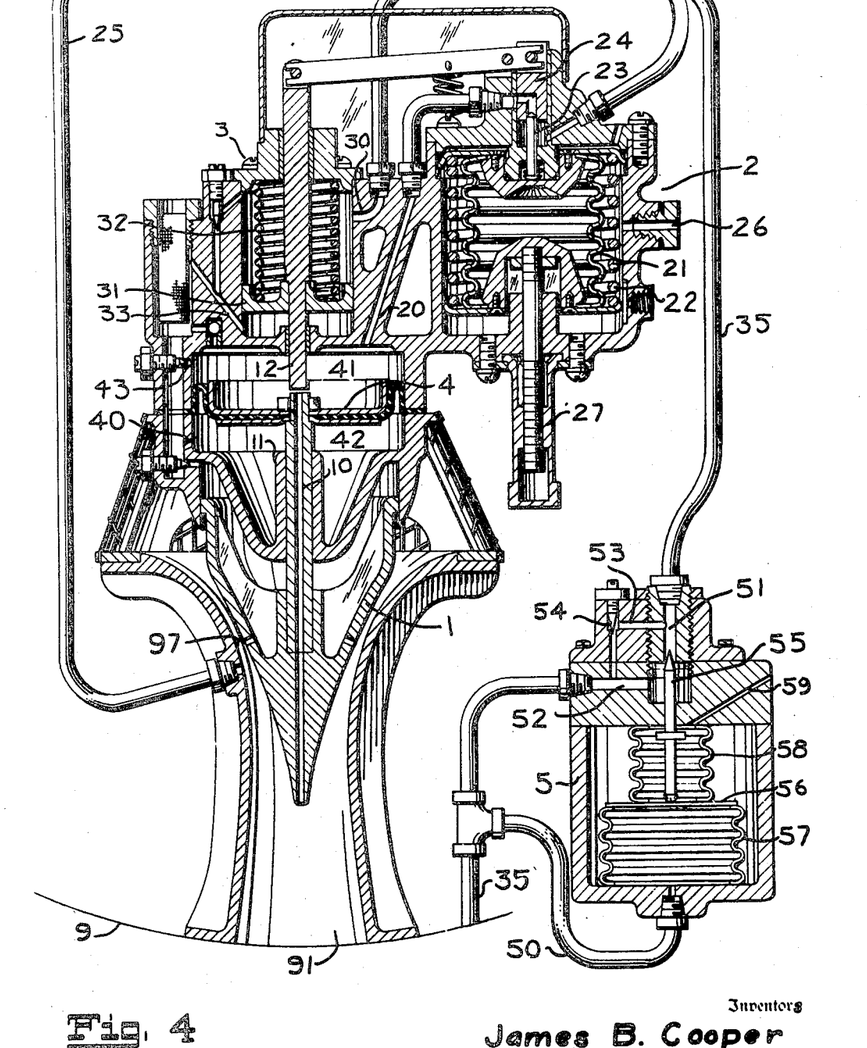
Figure 4 is a view similar to Figure 1, showing, however, a different type of ratio control for connection to the standard control unit.

For clearer understanding the control unit shown in Figure 4 will be described. The valve 1 is fixed upon a stem 10, guided at 11 for vertical movement, and upon the upper end of this stem is an actuating piston 4, which, with its diaphragm, divides the casing enclosing it into two chambers 41 and 42. Cabin pressure is admitted to the chamber 42 by way of the port 40, and the effective pressure in the chamber 41 depends upon the freedom with which cabin pressure leaks past the metering valve 43 and leaks out to atmosphere through one or more of alternative passages provided for that purpose. For instance, as shown in Figure 4, the stem 10 is hollow, and constitutes a possible path of communication with atmosphere. Such communication is controlled by the spacing of the spindle 12 (never more than a few thousandths of an inch) towards and from the end of the hollow stem 10. Such pneumatic valve actuating device and the communication controlling mechanism for it constitute a representative form of air pressure operated actuator for the flow controlling valve 1. This spindle is at one time under control of the differential pressure device 3, and at another time may be under control of the ratio control 5. Another possible path of communication with atmosphere from the chamber 41 is by way of the passages 20 and 25. The latter path is under control of the absolute-pressure device 2. It is the cumulative effect of pressure escaping to a low pressure region through the stem 10 or the passage 20, as it leaks in from the cabin past the valve 43, as opposed by the cabin pressure upon the under side of the piston 4, that is, within the chamber 42, which controls the position of the valve 1 through the valve actuating means or servo device 4.

The control means for the valve actuating means includes a cabin supercharging control which effects sufficient closing of the outflow valve 1 to create a differential of cabin air pressure over atmospheric pressure. Such supercharging control is shown as including, for example, the absolute-pressure control which comprises an evacuated bellows 21, collapse of which is resisted by a spring 22, which bellows controls an orifice pin or valve 23, movable in conjunction with a shiftable orifice block 24. The relative movement of pin 23 and ported block 24 controls outflow through the passage 20, and thence by way of the duct 25 to atmosphere or to the Venturi throat formed between the seat 97 and the valve 1. The bellows 21 is also subject exteriorly to cabin pressure through the port 26. It is so arranged that upon the attainment of a given pressure, for instance, 23 inches of mercury, corresponding to the atmospheric pressure at 8000 feet, the device 2 will be automatically operated to maintain that cabin pressure constant. The point at which absolute pressure operation commences may be varied by the adjustment device represented at 27.

The supercharging control may also include a differential-pressure control such as the device 3 incorporating a piston 31, slidable relative to the reduced lower end of the spindle 12. It is normally held in its lowermost position by the spring 32, and is acted upon at its lower side by cabin pressure communicating through the port 33; its upper side is connected to atmosphere by way of the port 30 and conduit 35. Upon the attainment of such a pressure difference at opposite sides of the piston 31 as will overcome the spring 32, the piston will rise until it engages the shoulder of the spindle 12, and it will cause the latter to rise and thereby to withdraw its lower end from the hollow stem 10. In so doing, the position of valve 1 will be altered, for the valve tends to follow the stem 10, causing the valve to open slightly, and thereby causing the cabin pressure to drop. In this manner, so long as valve 55, later described, is closed, there will be retained a substantially constant differential pressure within the cabin, as the airplane moves throughout a high altitude range.

The operation of the differential-pressure device 3 is dependent upon the maintenance or acquirement of a given pressure drop across the piston 31. If this pressure difference is disturbed, or altered, the effect is alteration of the differential pressure which is to be maintained. Alteration of the differential pressure by the operation of a ratio control, or of a device operable in accordance with the ratio between cabin pressure and exterior pressure, may be considered in one aspect as adjusting the differential device by infinitesimal increments, and thereby effecting control overriding that of the supercharging control in accordance with the pressure ratio, as desired.

Thus, if the conduit 35 is freely open to atmosphere, the upper side of piston 31 is affected by atmospheric pressure, and since its lower side, through the port 33, is affected by cabin pressure, it is a true differential pressure control. If, however, the conduit 35 is not connected directly and freely to atmosphere, but has a restriction in it, which restriction is variable in accordance with pressure ratio, then there is introduced a different pressure drop in the line between the differential device 3 and the atmosphere. Consequently, by suitable choice of the strength of the spring 32, as by initially weakening it so that, but for the ratio control, it would operate on a constant differential equal to $e-m$, the ratio control may modify the action of the differential mechanism to operate along a pressure ratio curve such as $j-m$, in Figure 5.

The conduit 35 communicates through the ratio control 5 with atmosphere at 35', either by way of the ports 51, 52, or by way of the by-pass port 53, in which is a metering valve 54, or both. Between the ports 51 and 52 is also a metering valve 55, which is controllable under the influence of a ratio control, that is, a control which is subject to the cabin pressure and atmospheric pressure at a definite ratio, such as 3 to 1, if that is the selected blower compression ratio.

Thus, for instance, the lower end of the valve 55 bears upon a diaphragm 56, which closes the end of a large bellows 57. This bellows 57 is connected to atmosphere by way of the duct 50. The diaphragm 56, at its upper side, mounts a smaller bellows 58, the interior of which is in communication with cabin pressure by way of the port 59. The interior of the casing 5 is evacuated. If the area of the diaphragm 56 which is subjected to atmospheric pressure, is three times the area of that diaphragm which is subjected to cabin pressure, the two will be in equilibrium, within the evacuated casing 5, whenever atmospheric pressure is one-third of cabin pressure. If atmospheric pressure is in excess of one-third of cabin pressure, the resultant of pressure on the diaphragm 56 urges the valve 55 upwardly to seat it in the end of passage 51, and all communication from 35 to 35' must be by way of the by-pass 53 and past the adjustable metering valve 54. Since the adjustment of this valve 54 is fixed, and creates a given pressure drop, the value of that pressure drop can be taken into account in initially adjusting the differential pressure device 3, and the latter may be made to operate at a differential pressure and with a pressure drop past its piston 31 which is less than the actual pressure drop between cabin and atmospheric pressures, by so much as is equivalent to the pressure drop past the valve 54.

Whenever the atmospheric pressure becomes so low, with relation to cabin pressure, that atmospheric pressure is less than one-third of cabin pressure, the total pressure on the upper side of diaphragm 56 is greater than the total pressure on the lower side of the diaphragm, and the valve 55 moves downwardly, opening communication between passages 51 and 52, and by so much lessening the pressure drop past the valve 54. This reacts in turn upon the differential-pressure device 3, and alters the setting of the valve 1; in effect, it causes further opening of the valve 1, that is, opening further than it would normally be opened by the differential-pressure device, with the result that cabin pressure drops more than it would drop if only the differential-pressure device were active, and hence, cabin pressure drops along a curve such as the characteristic curve j—m, or h—n, following the selected blower compression ratio.

Springs have not been shown, nor adjustments in connection with the bellows 57 and 58 and the ratio control 5, but such expedients may be used as necessary, and as will be obvious, and thereby the device may be made more sensitive, or its initial points and limits can be altered as required.

Figure 1:
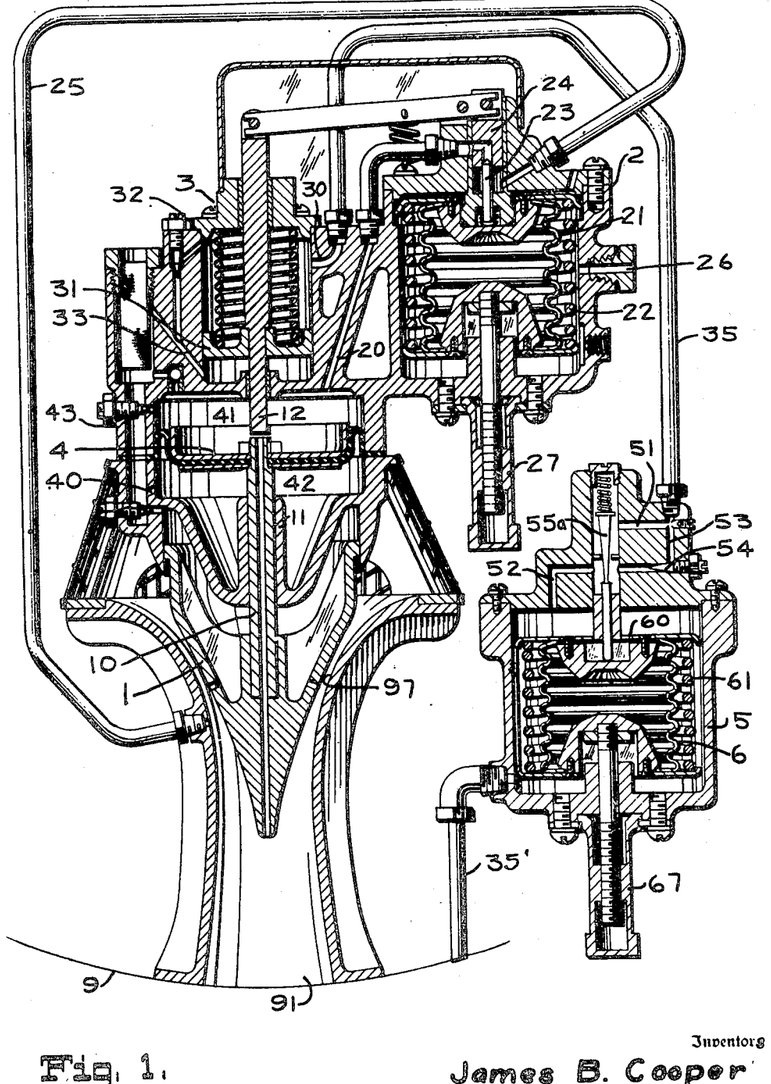
Figure 1 is a section through an outflow control unit or valve of known type, having an additional ratio control, likewise shown in section, connected in a line of the principal control unit.

The arrangement of Figure 4 has been first described because it incorporates a true ratio control; that is, a control which is subject to a higher pressure over a smaller area and an opposed lower pressure over a larger area. The arrangement of Figure 1 is quite similar, except that in Figure 1 the ratio control device 5 is not, strictly speaking, a ratio control, but operates under the influence of an absolute pressure device, an evacuated bellows 6, which, however, is arranged to operate in accordance with, if not directly under the influence of, the ratio of cabin pressure to exterior pressure.

As with the arrangement previously described, a metering valve 54 is set to control communication through a by-pass 53 connecting the conduits 35 and 35', but communication between passages 51 and 52 is under control of a metering valve 55a which is movable by the free end 60 of the evacuated bellows 6, and the opposed spring 61. The normal atmospheric pressure acting through 35' upon the evacuated bellows 6 will tend to hold the bellows collapsed in opposition to the spring 61 at all except the highest altitude range; for instance, above the point j of Figure 5. When the bellows 6 is thus collapsed, the valve 55a is closed and all communication between 35 and 35' is by way of the by-passage 53 past the valve 54 as before. However, when the airplane reaches the highest altitude range, at some selected value, in accordance with the strength of the spring 61 and of the bellows 6 considered as a spring, the bellows tends to expand, and this opens the valve 55a. If the exterior pressure continues to decrease, the valve 55a opens farther and farther, with the result, if parts are properly chosen and calibrated, that the cabin pressure decreases along the ratio curve such as j—m. This curve and its point of commencement can be varied by varying the position of the fixed end of the bellows by an adjustment such as is indicated at 67.

Figure 2:
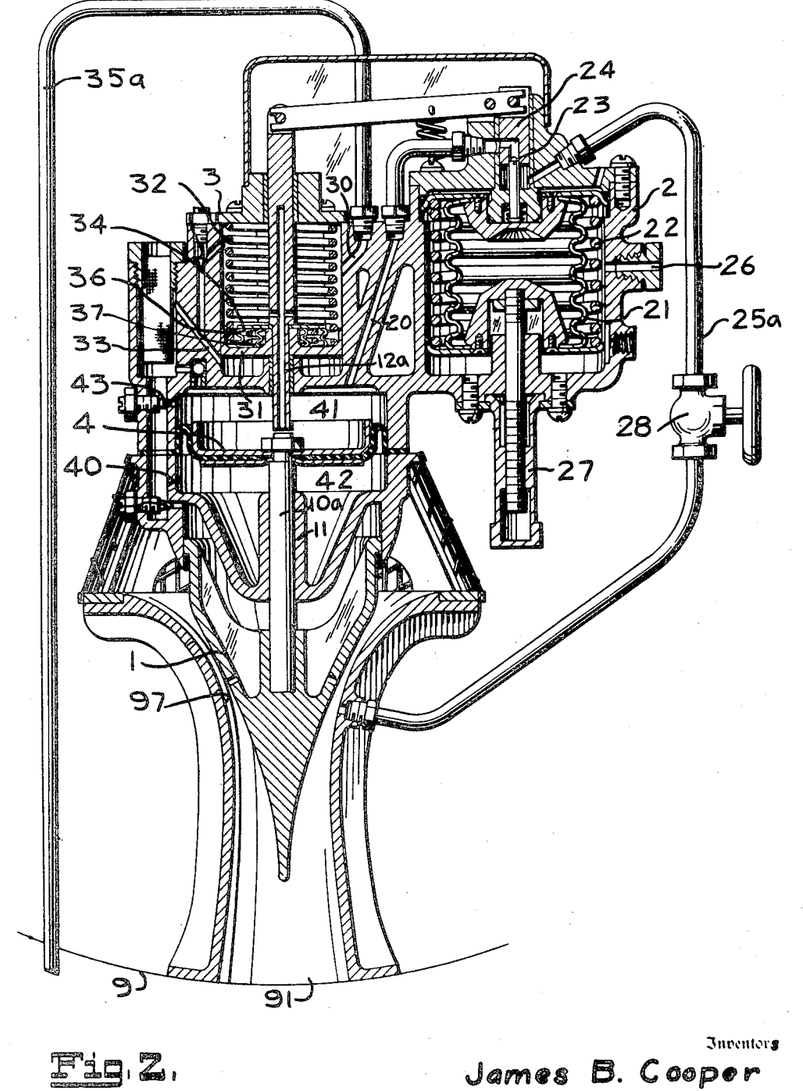
Figure 2 is a view similar to Figure 1, showing the ratio control inserted into a chamber of the existing control unit as a part of the differential control therein, and acting to modify that differential control.

The arrangement shown in Figure 2 is rather similar to those already described, particularly in that it shows an arrangement in which the known and existing control can be taken without reworking any part of it, and by merely alteration of the assembly or arrangement, or by the substitution of an assembly (in this instance, the differential assembly, or an equivalent assembly in the existing control), the existing control may be furnished with a ratio control.

The stem 10 might be hollow, as before, but in the alternate form shown in Figure 2 the valve stem 10a is not hollow, but instead the spindle 12a is hollow, affording communication thereby from the chamber 41 to atmosphere through the chamber at the upper side of the piston 31, and thence via the passage 30 and the conduit 35a, which latter extends direct to atmosphere. The absolute-pressure control 2 is also the same as has been described, save that it has a valve 28 included in the low pressure line 25a. The valve 28 may be normally open, so that there is no obstruction in the line 25a. However, if the absolute pressure device 2 should fail to operate properly, it can be cut out by closing the valve 28, which leaves the limiting differential-pressure sensitive device 3 still fully operable to prevent the cabin pressure exceeding the predetermined difference over exterior pressure, and then by suitable means the pressure supply can be augmented or manually controlled, if necessary, to supply adequate pressure within the cabin.

Interposed between the piston 31 of the differential pressure control 3 and the shoulder of the stem 12a, is what is, in effect, a diaphragm 34, acted upon by an evacuated bellows 36 and a spring 37. Normally the evacuated bellows 36 is held collapsed by atmospheric pressure communicating through the passage 35a and port 30. Upon decrease of the atmospheric pressure, however, at the highest altitude range, that is, above the point j, for example, the spring 37 gains the ascendancy and expands the bellows to raise diaphragm 34. Since this only occurs after the device has been operated under differential control for a time, that is, from h to j, the effect of this relative upward movement of the diaphragm 34 is to accelerate the rate of upward movement of the spindle 12a, hence the rate of opening of the valve 1. The effect of this is to cause decrease of absolute cabin pressure at a higher rate, by infinitesimal increments, and by proper choice and arrangement and adjustment of the parts, this decrease of cabin pressure, while not, strictly speaking, under ratio control, operates in accordance with the ratio of cabin pressure to exterior pressure.

Figure 3:
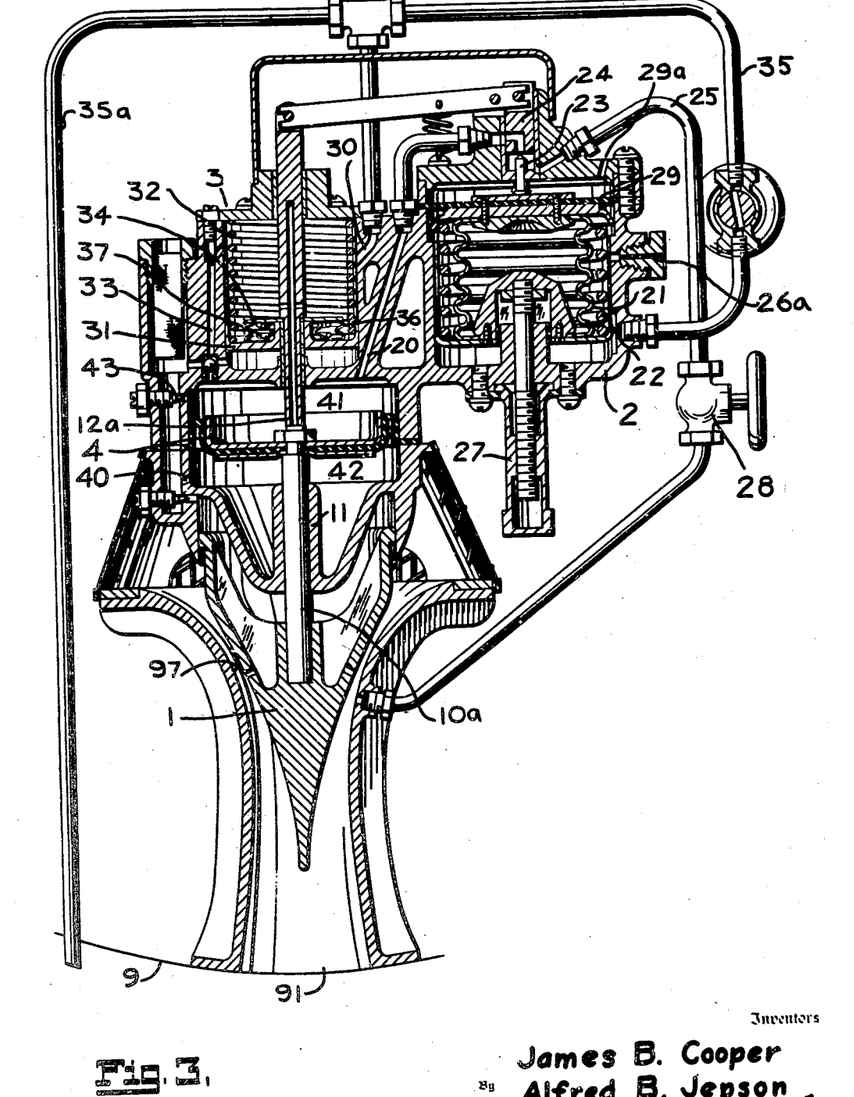
Figure 3 is a view similar to Figure 2, but showing the ratio control incorporated in a modified form of control unit.

In the arrangements heretofore described, except for the adjustment at 27, which was intended to vary the value of atmospheric pressure at which isobaric regulation commenced, or except for adjustment of the tension of the spring 32 in the differential control, which would vary the value of the differential pressure to be maintained, the devices have been such as were intended to follow the general curve at $$g\text{---}h\text{---}j\text{---}m$$

of Figure 5. However, it may be desired in some instances, to maintain a cabin pressure either from sea level or from some datum pressure at a higher altitude, which bears the relationship of a fixed fraction above or percentage of the difference between sea level (or the arbitrarily selected datum pressure) and actual atmospheric pressure. For instance, it may be desired that cabin pressure be maintained always half way between atmospheric pressure and the pressure at 8000 feet, for instance along the line $g\text{---}p\text{---}q\text{---}r$. Such an arrangement can be accomplished by the device illustrated in Figure 3. Nevertheless, it is necessary to place a limit on the absolute cabin pressure, for, with such a proportional arrangement, the cabin absolute pressure may still exceed that which the blower compression ratio can maintain at some high altitude, and it is therefore still necessary to insure that the ratio control will override all other controls.

Since the ratio control has been described in conjunction with Figure 2, no further detailed description thereof appears necessary. The main control in Fig. 3 differs from that heretofore described primarily in that the casing 2 is divided by a diaphragm 29 into an upper and a lower chamber. Within this lower chamber is an evacuated bellows 21, the tendency of which to collapse under pressure is resisted by the extension spring 22, acting upon the diaphragm 29. The spring force of the assembly can be adjusted as indicated at 27. The lower chamber is in communication with cabin pressure through the restricted bleed port 26a, and the upper chamber is in free communication with the cabin pressure by the open port 29a. The lower chamber is in communication with atmosphere past the valve 28a by way of the conduit 28c.

The passage 20 is in communication with a low-pressure source through the adjustably mounted orifice block 24 and the orifice pin or valve 23, the head whereof rests upon and is moved by the diaphragm 29. The relative positions of the pin 23 and orifice block 24 control communication of passage 20 with a low-pressure source, for instance that low pressure existing at the throat of the Venturi orifice past the valve 1 and its seat 97 by means of the conduit 25.

The valve 28a functions as a variable orifice related to the normally smaller fixed orifice 26a, which latter is exaggeratedly large in size in the drawings. The relation of absolute cabin pressure to sea level pressure, or to some other datum pressure, and to atmospheric pressure may be made to depend upon the size of the variable orifice, that is, upon the adjustment of the relative sizes of the orifice 26a and valve 28a. If the valve 28a, the variable orifice, is completely closed, the situation is as though the orifice 28a did not exist, and the device will function substantially the same as has been described in connection with the previous figures. With valve 28a closed, as in those figures, in effect the cabin pressure only is impressed upon the bottom and upon the top of the diaphragm 29, and the bellows 21 functions in response to removal of a collapsing force opposing its spring 22 to initiate cabin supercharging and to maintain cabin pressure. The cabin pressure will follow or parallel the atmospheric curve from $f$ to $g$. Then regulation is isobaric from $g$ to $h$, and after the limiting differential is reached, as determined by the piston 31, the differential curve $h\text{---}j\text{---}k$ is followed, or tends to be followed. However, the ratio control will take over at the point $j$, and the pressure curve thereafter will be along the line $j\text{---}m$. This is not the manner of operation which is primarily intended for this modified structure, but it illustrates how this structure can still operate in a manner wholly analogous to the structure previously described, while still possessing additional capabilities.

If the valve orifice at 28a is fully open, the chamber within the casing 2 and beneath the diaphragm 29 is nearly at atmospheric pressure, even though cabin pressure enters at 26a, for the fully opened orifice 28a is so much larger than the orifice 26a that cabin pressure entering this chamber at 26a is exhausted immediately by way of tube 35a, and its effect is negligible. It follows that there is a downward force over the whole of the area of the diaphragm 29 which is the cabin pressure times the diaphragm area, and that there is an equivalent opposing upward force equal to the fixed force of the spring 22, plus the force of the bellows 21 (considered as a spring) plus the atmospheric pressure over the annular diaphragm area outside the bellows 21, which latter, it will be remembered, is evacuated. These opposed forces can be so balanced that the atmospheric curve is departed from at any predetermined altitude by suitable adjustment of the spring force at 27.

To attain a pressure intermediate the isobaric curve $g\text{---}h$, and the atmospheric curve, from $b$ to $c$, it is only necessary to partially close the valve or adjustable orifice 28a to some point intermediate fully closed and fully opened position. By so doing, it is clear that with increasing closure of valve 28a the escape of pressure from the lower chamber within the casing 2 is increasingly slower, and that there is a corresponding increase in the upwardly acting forces on the diaphragm 29. The result of this is to maintain the cabin pressure, not at a constant or isobaric value, not at atmospheric, but at some intermediate value, perhaps halfway between such as represented by curve $g\text{---}r$, at all altitudes within this range, and indeed, within a further range of higher altitude until some overriding control, for instance the differential control, or the ratio control, overcomes the tendency to increase cabin absolute pressure.

In the devices of this application the control unit is unchanged, except by removal of the differential assembly or alteration of the spring force thereof in the forms shown in Figures 2 and 3, yet there is incorporated in these devices a ratio control. In other forms, shown in Figures 1 and 4, the control unit is completely unchanged, other than the substitution of a weaker spring at 32, and there is merely added to it, perhaps with some rearrangement of exterior tubing, a ratio control unit. Nevertheless with these arrangements the control according to ratio can be employed in conjunction with a control device having the capability of absolute-pressure control, of differential-pressure limiting control, and of proportional control from any datum level upwards.

It should be noted also that the high altitude ratio control arrangements of Figures 1, 2 and 3 are not controllable under the direct influence of the ratio of cabin pressure to exterior pressure, but rather in accordance with that ratio, though by the means of an absolute-pressure device operable in response to variations in the external atmospheric pressure. However, in Figure 4 the control is under the influence of what is, strictly speaking, a ratio control, that is, a control which is operable by cabin pressure and exterior atmospheric pressure, as well as in accordance with the ratio of cabin pressure to exterior pressure.

While in this application the ratio control has been incorporated primarily in conjunction with the differential-pressure control, it is possible to associate it with the absolute-pressure control instead, and arrangements to that end are shown in the generic case filed coincidentally herewith. The arrangement may be such that no differential-pressure control is required, the ratio control taking over at the highest altitude permissible under absolute control.

In effect, then, the ratio control is a further control which can be used in conjunction with a previous control device, and which superimposes a final control for the highest altitude range, operable in a manner to prevent the cabin pressure exceeding an absolute value greater than a given ratio to the exterior atmospheric pressure.

What we claim as our invention is:

1. Mechanism to control flow of air through an aircraft cabin having air supplied thereto under pressure, comprising a valve movable to control such air flow, an air pressure operated actuator operatively connected to said valve to move the same, passages affording communication between a high pressure region and said actuator and between said actuator and a low pressure region for flow of air through said actuator to operate the same, and a control unit including a regulatable valve connected to control flow of air through said passages and actuator from such high pressure region to such low pressure region, an evacuated bellows accessible to ambient atmospheric pressure tending to collapse the bellows, a spring acting on said bellows and producing a force capable of expanding the same in opposition to the pressure thereon of the ambient atmosphere, the resilience of said spring being of such value as to effect predetermined expansion of said bellows for a given decrease in ambient atmospheric pressure, and means operatively interconnecting said bellows and said regulatable valve and operable by such predetermined expansion of said bellows to effect corresponding movement of said regulatable valve for controlling the flow of air through said passages and actuator, and said actuator being operable by such control of the air flow therethrough to move said first valve to decrease the cabin pressure to a greater degree than such decrease in ambient atmospheric pressure, for maintaining substantially a constant ratio of cabin pressure to ambient atmospheric pressure determined by the resilience of said spring.

2. In cabin pressure control mechanism, an outflow valve governing the flow of air from the cabin, a diaphragm operatively connected to said valve, the diaphragm dividing a space into a high pressure chamber and a low pressure chamber, the high pressure chamber having communication with the cabin's interior, the pressure wherein, acting upon the diaphragm, tends to open said valve, a passage operable to connect the low pressure chamber with a region of pressure substantially lower than cabin pressure, control valve means closing such passage while the differential of cabin pressure over exterior pressure is less than a selected value, and the ambient atmospheric pressure exceeds a selected low value, an evacuated bellows accessible to ambient atmospheric pressure tending to collapse the bellows, a spring acting on said bellows and producing a force capable of expanding the same in opposition to the pressure thereon of such selected low value of ambient atmospheric pressure, the resilience of said spring being of such value as to effect predetermined expansion of said bellows for a given decrease in ambient atmospheric pressure, and means operatively interconnecting said bellows and said control valve means and operable by such predetermined expansion of said bellows to effect corresponding opening movement of said control valve means for increasing the flow of air through said passage to alter the pressure difference acting upon said diaphragm, and said diaphragm being operable by such alteration in pressure difference thereon to open said outflow valve sufficiently to decrease the cabin pressure to a greater degree than such decrease in ambient atmospheric pressure, for maintaining the ratio of cabin pressure to ambient atmospheric pressure below a selected ratio determined by the resilience of said spring.

3. Mechanism to control flow of air through an aircraft cabin having air supplied thereto under pressure, comprising a valve movable to control such air flow, an actuator operatively connected to said valve to move the same, a differential pressure control device for regulating said actuator to maintain a predetermined differential of cabin pressure over ambient atmospheric pressure, including a cylinder and a piston therein having one side accessible to cabin pressure and its opposite side accessible to ambient atmospheric pressure, a spring resisting movement of the piston under the influence of the differential of cabin pressure over ambient atmospheric pressure acting thereon, yieldable to permit movement of the piston when subjected to a predetermined minimum pressure difference, and means operatively connecting said piston to said actuator and including an evacuated bellows accessible to ambient atmospheric pressure tending to collapse the bellows, and a spring acting on said bellows and producing a force capable of expanding the same in opposition to the pressure thereon of a predetermined low value of ambient atmospheric pressure, the resilience of said spring being of such value as to effect predetermined expansion of said bellows for a given decrease in ambient atmospheric pressure within the range below such predetermined low value, and said means being operable by movement of said piston alone to effect operation of said actuator for moving said valve while said bellows is held collapsed by ambient amtospheric pressure exceeding such predetermined low value, and being further operable by such expansion of said bellows to effect additional movement of said actuator for moving said valve to decrease the cabin pressure to a greater degree than such decrease in ambient atmospheric pressure, for maintaining the ratio of cabin pressure to ambient atmospheric pressure below a selected ratio determined by the resilience of said spring regardless of the operative position of said piston when the ambient atmospheric pressure has dropped below such predetermined low value.

4. Mechanism to control flow of air through an aircraft cabin, comprising a valve movable to control such air flow, air pressure operated actuating means operatively connected to said valve to effect movement of the same, a passage affording communication between said actuating means and the ambient atmosphere, and a control unit including a regulatable valve interposed in said passage to atmosphere, a further valve arranged in a by-passage in said passage to atmosphere around the regulatable valve, adjustable to modify the control of said regulatable valve over flow through said passage to atmosphere, an evacuated bellows accessible to ambient atmospheric pressure tending to collapse the bellows, a spring acting on said bellows and producing a force capable of expanding the same in opposition to the pressure thereon of a predetermined low value of ambient atmospheric pressure, the resilience of said spring being of such value as to effect predetermined expansion of said bellows for a given decrease in ambient atmospheric pressure, and means operatively interconnecting said bellows and said regulatable valve and operable by such predetermined expansion of said bellows to effect corresponding movement of said regulatable valve for controlling the flow of air through said passage to atmosphere, thereby altering the air pressure to which said actuating means are subjected, said actuating means being operable by such alteration in air pressure to effect movement of said first valve to decrease the cabin pressure to a greater degree than such decrease in ambient atmospheric pressure for maintaining the ratio of cabin pressure to ambient atmospheric pressure below a selected ratio determined by the resilience of said spring.

5. Mechanism to control flow of air through an aircraft cabin having ambient atmospheric air supplied thereto under pressure at a selected maximum compression ratio, comprising an outflow valve movable to control flow of air from the cabin, valve actuating means operable to move said valve for controlling such air outflow to establish a pressure within the cabin exceeding the ambient atmospheric pressure, ratio control means for said valve actuating means including resilient bellows means accessible only to the ambient atmosphere, the resilience of said bellows means opposing the force exerted thereon by pressure from the ambient atmosphere, such resilience being of such value as to effect predetermined expansion of said bellows means for a given decrease in ambient atmospheric pressure, and means operatively connecting said control means to said valve-actuating means to operate the same by such resilience-effected expansion of said ratio control resilient bellows means for opening said valve to decrease the cabin pressure to a greater degree than such decrease in ambient atmospheric pressure, to maintain substantially a predetermined ratio of cabin pressure to ambient atmospheric pressure not exceeding the maximum compression ratio of the pressure of air supplied to the cabin to ambient atmospheric pressure.

6. Mechanism to control flow of air through an aircraft cabin having air supplied thereto under pressure, comprising a valve movable to control such air flow, an air pressure operated actuator operatively connected to said valve to move the same, passages affording communication between a high pressure region and said actuator and between said actuator and a low pressure region for flow of air through said actuator to operate the same, control means including a regulatable valve connected to control flow of air through said passages and actuator from such high pressure region to such low pressure region, resilient pressure sensitive means accessible only to the ambient atmosphere, the resilience of said pressure sensitive means opposing the force exerted thereon by pressure from the ambient atmosphere, such resilience being of such value as to effect predetermined movement of said pressure sensitive means for a given decrease in the ambient atmospheric pressure, and means operatively interconnecting said resilient pressure sensitive means and said regulatable valve, and operable by such predetermined movement of said resilient pressure sensitive means to effect corresponding movement of said regulatable valve for controlling the flow of air through said passages and actuator, and means operatively connecting said control means to said actuator to operate the same by such control of the air flow therethrough for moving said first valve to decrease the cabin pressure to a greater degree than such decrease in ambient atmospheric pressure, to maintain the ratio of cabin pressure to ambient atmospheric pressure below a selected ratio determined by the resilience of said pressure sensitive means.

7. Mechanism to control flow of air through an aircraft cabin having air supplied thereto under pressure, comprising a valve movable to control such air flow, valve actuating means operable to move said valve for controlling the air flow to establish a pressure within the cabin exceeding the ambient atmospheric pressure, differential pressure sensitive means communicating with the cabin and with the ambient atmosphere, movable by a difference in pressures acting thereon effected by such communication, means operatively connecting said differential pressure sensitive means to said valve actuating means to operate the same automatically in response to movement of said differential pressure sensitive means, normally to effect movement of said valve for regulating the air flow through the aircraft cabin to maintain a predetermined difference of cabin pressure over ambient atmospheric pressure, ratio control resilient pressure sensitive means accessible only to the ambient atmosphere, the resilience of said pressure sensitive means opposing the force exerted thereon by pressure from the ambient atmosphere, such resilience being of such value as to effect predetermined movement of said pressure sensitive means for a given decrease in the ambient atmospheric pressure below a predetermined low value, and means operatively connecting said ratio control resilient pressure sensitive means to said differential pressure sensitive means, said resilient pressure sensitive means being operable thereby to modify the difference in the pressures acting on said differential pressure sensitive means to effect movement of said valve in addition to the movement thereof normally effected by said differential pressure sensitive means, to decrease the cabin pressure to a greater degree than such decrease in ambient atmospheric pressure for reducing the differential of cabin pressure over ambient atmospheric pressure below such predetermined pressure difference upon decrease of the ambient atmospheric pressure below such predetermined low value.

8. Mechanism to control flow of air through an aircraft cabin having air supplied thereto under pressure, comprising a valve movable to control flow of air through the cabin, valve actuating means operable to move said valve for controlling such air flow to establish a pressure within the cabin exceeding the ambient atmospheric pressure, control means for said valve actuating means including a supercharging control operable to control said valve actuating means for moving said valve sufficiently to create a differential of cabin pressure over ambient atmospheric pressure, and a ratio control having resilient pressure sensitive means accessible only to the ambient atmosphere, the resiliency of said pressure sensitive means opposing the force exerted thereon by pressure from the ambient atmosphere, such resilience being of such value as to effect predetermined movement of said pressure sensitive means for a given decrease in the ambient atmospheric pressure, and means operatively connecting said control means to said valve-actuating means to operate the same during ascent of the aircraft, initially by said supercharging control and thereafter by such resilience-effected movement of said ratio control resilient pressure sensitive means for moving said valve to decrease the cabin pressure to a greater degree than such decrease in ambient atmospheric pressure, to maintain substantially a predetermined ratio of cabin pressure to ambient atmospheric pressure.

9. Mechanism to control flow of air through an aircraft cabin having ambient atmospheric air supplied thereto under pressure at a selected maximum compression ratio, comprising an outflow valve movable to control flow of air from the cabin, valve actuating means operable to move said valve for controlling such air outflow to establish a pressure within the cabin exceeding the ambient atmospheric pressure, control means for said valve actuating means including a supercharging control operable to control said valve actuating means for closing said valve sufficiently to create a differential of cabin pressure over ambient atmospheric pressure, and a ratio control having resilient pressure sensitive means accessible only to the ambient atmosphere, the resiliency of said pressure sensitive means opposing the force exerted thereon by pressure from the ambient atmosphere, such resilience being of such value as to effect predetermined movement of said pressure sensitive means for a given decrease in ambient atmospheric pressure, and means operatively connecting said control means to said valve actuating means to operate the same during ascent of the aircraft, initially by said supercharging control and thereafter by such resilience-effected movement of said ratio control resilient pressure sensitive means for opening said valve to decrease the cabin pressure to a greater degree than such decrease in ambient atmospheric pressure, to maintain substantially a predetermined ratio of cabin pressure to ambient atmospheric pressure not exceeding the maximum compression ratio of the pressure of air supplied to the cabin to ambient atmospheric pressure.

10. Mechanism to control flow of air through an aircraft cabin having ambient atmospheric air supplied thereto under pressure at a selected maximum compression ratio, comprising a valve movable to control flow of air through the cabin, valve actuating means operable to move said valve for controlling such air flow to establish a pressure within the cabin exceeding the ambient atmospheric pressure, control means for said valve actuating means including a supercharging control operable to control said valve actuating means for moving said valve sufficiently to create a differential of cabin pressure over ambient atmospheric pressure, and a ratio control having an evacuated bellows accessible only to the ambient atmosphere tending to collapse the bellows, and a spring acting on said bellows and producing a force capable of expanding the same progressively in opposition to the force thereon of progressively decreasing pressure from the ambient atmosphere, the resiliency of said spring being of such value as to effect predetermined expansion of said bellows for a given decrease in ambient atmospheric pressure, and means operatively connecting said control means to said valve-actuating means to operate the same during ascent of the aircraft, initially by said supercharging control, and thereafter by such spring-effected expansion of said ratio control bellows for moving said valve to decrease the cabin pressure to a greater degree than such decrease in ambient atmospheric pressure, to maintain a cabin pressure to ambient atmospheric pressure ratio not exceeding such selected maximum compression ratio of the air supplied to the cabin, thus to enable a substantial quantity of air to be supplied to the cabin at such compression ratio at all flight altitudes.

11. Mechanism to control flow of air through an aircraft cabin having ambient atmospheric air supplied thereto under pressure at a selected maximum compression ratio, comprising a valve movable to control flow of air through the cabin, valve actuating means operable to move said valve for controlling such air flow to establish a pressure within the cabin exceeding the ambient atmospheric pressure, control means for said valve actuating means including a supercharging control operable to control said valve actuating means for moving said valve sufficiently to create a differential of cabin pressure over ambient atmospheric pressure, and a ratio control having an evacuated bellows accessible only to the ambient atmosphere tending to collapse the bellows, and a spring acting on said bellows and being sufficiently pliant to be operable only at ambient atmospheric pressures less than a predetermined low value to expand said bellows progressively in opposition to the force thereon of progressively decreasing pressure from the ambient atmosphere, the resiliency of said spring being of such value as to effect predetermined expansion of said bellows for a given decrease in ambient atmospheric pressure within the range below such predetermined low value, and means operatively connecting said control means to said valve-actuating means to operate the same during ascent of the aircraft in atmosphere at pressures greater than such predetermined low value by said supercharging control, and in atmosphere at pressures less than such predetermined low value by such spring-effected expansion of said ratio control bellows for moving said valve to decrease the cabin pressure to a greater degree than such decrease in ambient atmospheric pressure, to maintain a cabin pressure to ambient atmospheric pressure ratio not exceeding such selected maximum compression ratio of the air supplied to the cabin, thus to enable a substantial quantity of air to be supplied to the cabin at such compression ratio at all flight altitudes.

JAMES B. COOPER.
ALFRED B. JEPSON.

REFERENCES CITED

The following references are of record in the file of this patent:

UNITED STATES PATENTS

| Number | Name | Date |
|---|---|---|
| 2,208,554 | Price | July 16, 1940 |
| 2,265,461 | Wagner | Dec. 9, 1941 |
| 2,276,371 | Cooper | Mar. 17, 1942 |
| 2,316,416 | Gregg | Apr. 13, 1943 |
| 2,258,054 | Heidbrink | Oct. 7, 1941 |

FOREIGN PATENTS

| Number | Country | Date |
|---|---|---|
| 521,623 | British | May 27, 1940 |
| 679,386 | French | Jan. 9, 1930 |

OTHER REFERENCES

"Pressurized Cabin Control" by Tinker & Hubbard, pub. "Aviation," Jan., 1941, pp. 38, 119, 124. (Copy in 128–204.)